Nov. 13, 1928.
G. C. GOODE
VEHICLE SPRING CONNECTION
Filed Dec. 9, 1922
1,691,185
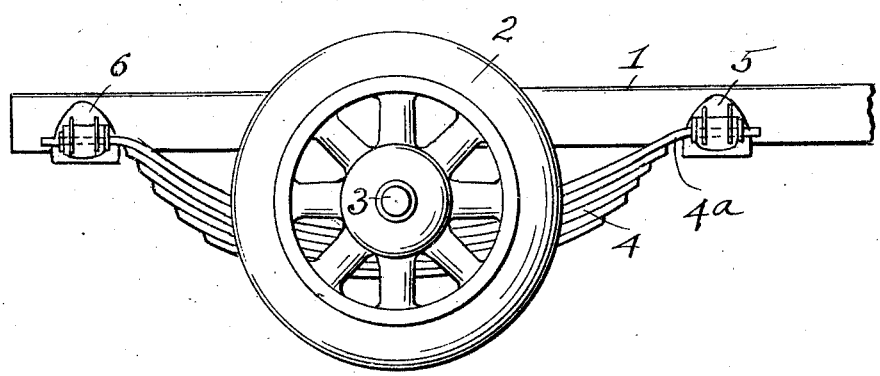
Fig. 1.
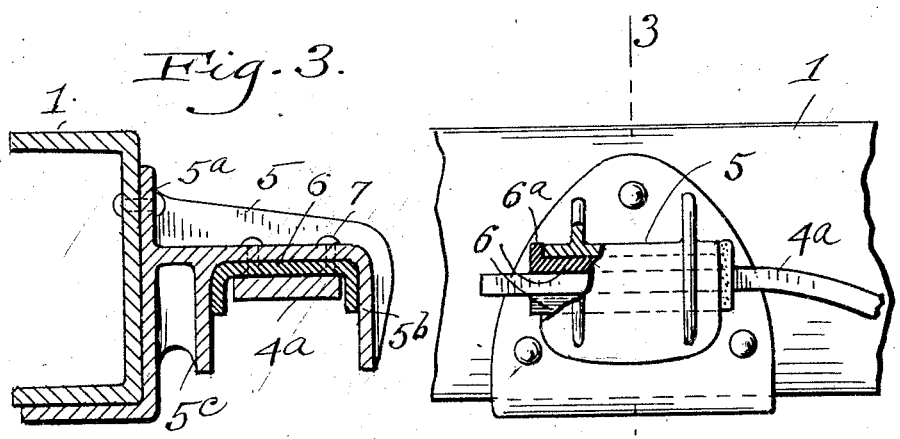
Fig. 3.
Fig. 2.
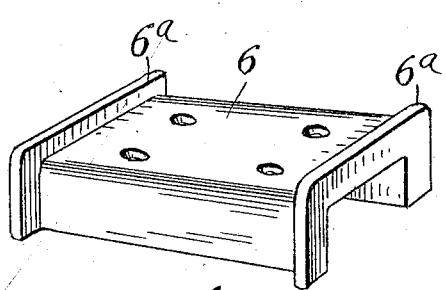
Fig. 4.
Inventor
Gilbert C. Goode
by
Thurston Kwint Hudson
attys Patented Nov. 13, 1928.

1,691,185

UNITED STATES PATENT OFFICE.

GILBERT C. GOODE, OF EAST CLEVELAND, OHIO, ASSIGNOR TO THE WHITE MOTOR COMPANY, OF CLEVELAND, OHIO, A CORPORATION OF OHIO.

VEHICLE-SPRING CONNECTION.

Application filed December 9, 1922. Serial No. 605,838.

The present invention relates to motor vehicle construction, and more particularly to that portion thereof wherein the springs are connected with and support the chassis. It has heretofore been proposed to mount a semi-elliptic spring with the center portion of an axle, and having one or both of the ends either secured by shackles to the side member of the frame of the chassis, or to have one or both of the ends of the springs so mounted as to slidingly engage with brackets or other suitable portions carried by the chassis frame.

Experience has shown with constructions of this character that metal surface rubbing on a metal surface causes seizure between the metal surfaces, which results in crystallizing effects and in breakage because while the lubricant is supplied to the engaging surfaces, yet the fact is that in practice the lubricant is squeezed out and is non-effective.

One of the objects of the present invention is to provide a construction wherein one or both ends of a semi-elliptic spring are free to slide in the mountings for the ends, which mountings are carried by the chassis, but provision is made whereby the metal of the springs does not rub upon the metal of which the bracket receiving the ends of the springs is customarily made.

A further object is to provide a lining of a non-metallic nature, such for instance, as material ordinarily known as brake band material, which permits easy sliding of the ends of the springs, but prevents binding action and facilitates the spring movement.

Reference should be had to the accompanying drawings forming a part of this specification, in which Fig. 1 is an elevation of a portion of a motor vehicle chassis showing the wheel and spring; Fig. 2 is an elevation of one of the brackets by which an end of the spring is mounted; Fig. 3 is a sectional elevation along the line 3—3 of Fig. 2, and Fig. 4 is a perspective view showing a formed up member of material such as brake band material which co-operates with the bracket.

Referring to the drawings, 1 indicates a side member of a chassis, 2 indicates a wheel, and the axle upon which the wheel is mounted may be said to be represented at 3. A semi-elliptic spring 4 is mounted upon the axle 3 in any approved manner, and the ends of the spring as shown in the present instance are slidably mounted in brackets 5 and 6 which are mounted on the side member 1 of the chassis.

It will be understood that only one of the springs is shown and that the other springs may be similarly mounted, and it will be furthermore understood that while in the present instance both ends of a spring are slidably mounted only one of the spring ends may be mounted where this is so desired.

In a construction of this kind where the spring ends are slidably mounted with respect to the chassis, a suitable reach rod construction will be employed whereby the driving effect of the wheels to the chassis is taken care of by the reach rod.

Each of the brackets 5 comprises a portion $5^a$ by which the bracket is attached to the side member of the chassis and has an outwardly extending portion that has two downwardly extending flanges $5^b$ and $5^c$. Within these flanges $5^b$ and $5^c$ there is secured a member which directly co-operates with the spring and against which the spring may rub. As before stated, this member may very satisfactorily be made of brake lining material or material of similar nature, although the invention is not limited in this respect.

In the drawing, at Fig. 4, there is shown a member 6 which is formed to fit within the flanges $5^b$ and $5^c$, and is fastened thereto by means of suitable fastening means 7 which in the present instance are copper rivets. In the member 6, as shown in Fig. 4, the end portions are flanged up as indicated at $6^a$, so that when the member 6 is assembled with respect to the bracket 5, the flanges $6^a$ will lie outside of the end portions of the flanges $5^b$ and $5^c$.

The particular form which is here given to the member 6 is not essential to the successful operation of the invention.

The top leaf $4^a$ of the spring 4 is extended, as is usual, and this top leaf passes between the flanges $5^b$ and $5^c$ with the top surface thereof lying in contact with the member 6. Therefore, as the movement of the ends of the top leaf $4^a$ occurs under conditions of use of the motor vehicle, the rubbing action between the end of the leaf is against the member 6, which as before stated, is of material which permits the movement of the spring without binding action, at least of any nature that is deteriorating to the spring. In the event that the material of which the member 6 is composed wears out, it is a comparatively simple matter to replace the same.

Having described my invention, I claim:—

In a motor vehicle, longitudinally extending angle frame members, an axle, a wheel mounted on the axle, a spring extending longitudinally of the vehicle connected to the axle and having its ends free, angle brackets embracing the axle frame members and connected thereto upon opposite sides of the axle, said brackets having downwardly facing channels spaced laterally outwardly from the frame members for receiving the free ends of said spring, and lining members of fibrous material secured to said brackets and covering the bottoms of said channels, said linings having a rubbing contact with the free ends of the spring upon which they bear.

In testimony whereof, I hereunto affix my signature.

GILBERT C. GOODE.